United States Patent [19]

Sturgis

[11] 4,290,440
[45] Sep. 22, 1981

[54] QUICK DISCONNECT COUPLING WITH A HEAT-SENSITIVE CUTOFF FEATURE

[75] Inventor: Malcolm B. Sturgis, St. Louis, Mo.

[73] Assignee: M. B. Sturgis, Inc., St. Louis, Mo.

[21] Appl. No.: 186,175

[22] Filed: Sep. 11, 1980

[51] Int. Cl.³ .............................................. F16K 13/04
[52] U.S. Cl. ..................................... 137/75; 251/149.6
[58] Field of Search ..................... 137/74, 75, 77, 72; 251/149.6; 285/2, 3, 4

[56] References Cited

U.S. PATENT DOCUMENTS

| | | | |
|---|---|---|---|
| 3,088,436 | 5/1978 | Altenes | 137/75 |
| 3,245,423 | 4/1966 | Hansen | 137/74 |
| 3,474,810 | 10/1969 | Welsh | 137/75 |
| 3,532,101 | 10/1970 | Snyder | 137/75 |
| 3,608,570 | 9/1971 | McKhann | 137/75 |

*Primary Examiner*—Harold W. Weakley
*Attorney, Agent, or Firm*—Senniger, Powers, Leavitt and Roedel

[57] ABSTRACT

A quick-disconnect coupling with a heat-sensitive cutoff feature for use in connecting a tank of pressurized gas (e.g., natural or LP gas) with a gas appliance, such as an outdoor gas grill. The coupling comprises interengageable plug and socket components, the latter component having a passage therethrough, a valve seat in the passage and a poppet valve in the passage comprising a valve stem and a sealing member soldered on the stem and engageable with the valve seat. A spring is engageable with the sealing member for biasing the poppet valve to a closed position for blocking flow through the passage. When inserted into the socket chamber, the plug component engages the valve stem for forcing the poppet valve open. In the event the temperature of the coupling rises to a temperature above the melting point of the solder bond between the sealing member and the valve stem, the sealing member is slidable on the stem into engagement with the valve seat for cutting off flow therepast.

14 Claims, 5 Drawing Figures

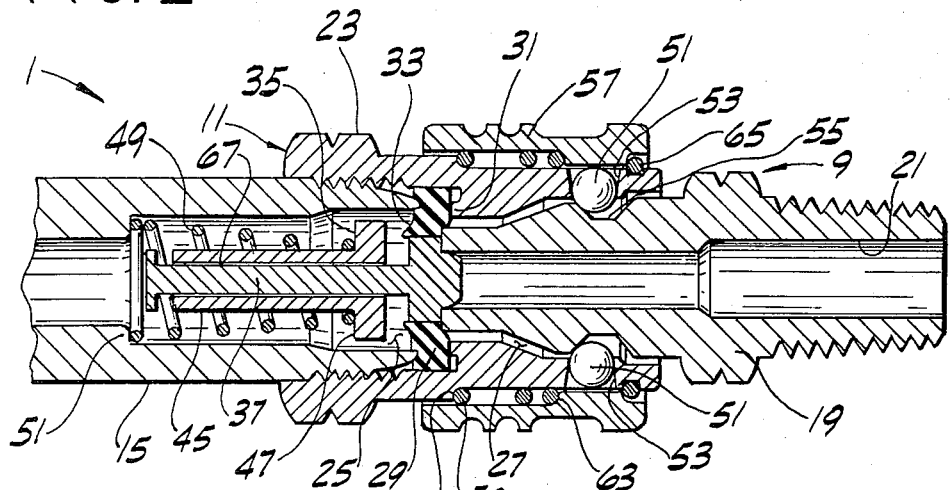
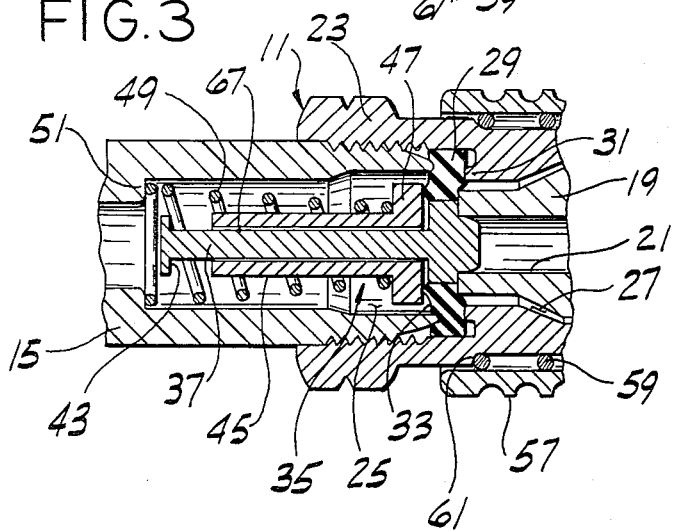
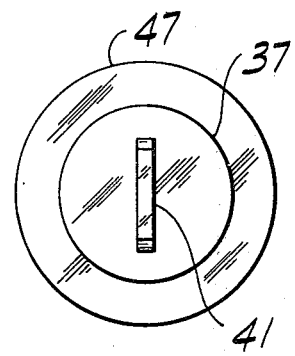
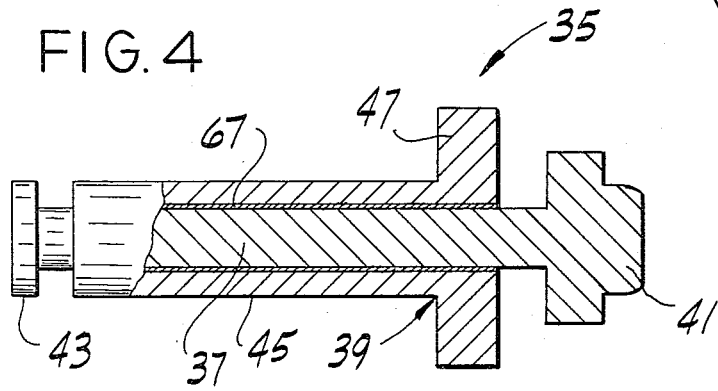

QUICK DISCONNECT COUPLING WITH A HEAT-SENSITIVE CUTOFF FEATURE

BACKGROUND OF THE INVENTION

This invention relates generally to quick-disconnect couplings and more particularly to a quick-disconnect coupling which is especially adapted for use in applications involving a combustible gas (e.g., natural or LP gas), the coupling having a heat-sensitive cutoff feature for shutting off gas flow when subjected to dangerously high temperatures.

Gas outdoor barbecue grills are typically fueled by natural or LP gas stored under pressure in portable refillable tanks or cylinders. Replacing an empty cylinder has heretofore been a relatively burden-some and time-consuming task, involving unscrewing and then screwing back together the various component parts of the connection (known in the trade as a "POL" fitting) between the cylinder and the gas line to the grill. Moreover, improper reconnection may result in dangerous gas leakage from the cylinder.

The use of a quick-disconnect coupling between the tank and the gas line to the appliance has been suggested as a solution to the above-mentioned problem. One particular coupling which has been proposed for such use includes a socket fitting for connection to the cylinder and a plug fitting for connection to the gas line. The socket has a passage therethrough, a valve seat in the passage and a one-piece poppet valve spring-biased to a closed position against the valve seat for blocking gas flow from the cylinder. The plug fitting comprises an elongate plug body which is receivable in the outlet end of the socket passage for engagement with the poppet valve to force it open, and a flange soldered to the plug body. Detent balls in the walls of the socket fitting are engageable with this flange for holding the plug and socket fittings in assembly. In the event the temperature of the coupling rises to a dangerously high level, the solder bond between the plug body and flange melts, enabling the spring-biased poppet valve to close by pushing the plug body downstream relative to the flange, which is retained in fixed position relative to the socket fitting by the detent balls.

While this automatic safety cutoff feature is desirable, the particular design described above is disadvantageous in that the plug body and gas line to which it is attached present a substantial amount of resistance to movement of the spring-biased poppet valve to its closed position. If the resistance is too great for the poppet valve spring to overcome, the cutoff mechanism will fail to operate.

SUMMARY OF THE INVENTION

Among the several objects of this invention may be noted the provision of a quick-disconnect coupling with a heat-sensitive cutoff feature for connecting a fuel source, such as a tank of pressurized gas, to the fuel line of an appliance, such as a gas barbecue grill; the provision of such a coupling which automatically cuts off the flow of fuel from the fuel source in the event the coupling temperature exceeds a predetermined temperature; the provision of such a coupling wherein the force required to effect said cutoff is minimized; the provision of such a coupling which blocks fuel flow to the appliance unless the cutoff mechanism is operational; the provision of such a coupling which has plug and socket components and wherein operation of the automatic cutoff mechanism is entirely independent of the type of plug component used; and the provision of such a coupling which is reliable in use and durable.

Generally, a quick-disconnect coupling with a heat-sensitive cutoff feature of the present invention is used for connecting a fuel source, such as a tank of pressurized gas, with a gas appliance, such as an outdoor gas grill. The coupling comprises interengageable plug and socket components, the latter component having a passage therethrough with inlet and outlet ends, the outlet end forming a chamber for receiving the plug component, a valve seat in the passage, a valve member in the passage comprising a valve stem and sealing means on the valve stem engageable with the valve seat, the valve member being movable in the passage between a closed position in which said sealing means is in sealing engagement with the valve seat to block flow therepast, and an open position in which the sealing means is spaced away from the valve seat to permit flow through the passage. Spring means is engageable with the above-mentioned sealing means for biasing the valve member toward a closed position. When inserted into the socket chamber, the plug component is adapted to engage the valve stem for moving the valve member against the bias of the spring means from its closed to its open position for flow of fuel past the valve seat. The coupling further comprises means for detachably connecting the plug and socket components with the plug component received in the socket chamber and holding the valve member in its open position. The sealing means is secured in fixed position with respect to the valve stem by means having a relatively low melting point whereby when the plug and socket components are connected and the melting point is exceeded, the aforesaid spring means is adapted to move said sealing means with respect to the valve stem into sealing engagement with the valve seat to cut off flow of fuel from the fuel source. Other objects and features will be in part apparent and in part pointed out hereinafter.

BRIEF DESCRIPTION OF THE DRAWINGS

FIG. 2 is an enlarged sectional view of the coupling of FIG. 1 showing plug and socket components detachably connected before actuation of a heat-sensitive cutoff mechanism;

FIG. 3 is a view similar to FIG. 2 showing the plug and socket components after actuation of the cutoff mechanism;

FIG. 4 is an enlarged view showing a two-piece poppet valve member of the coupling with parts broken away for purposes of illustration; and FIG. 5 is a right-end elevation of the valve member shown in FIG. 4.

Corresponding reference characters indicate corresponding parts throughout the several views of the drawings.

DESCRIPTION OF A PREFERRED EMBODIMENT

Figure 1:
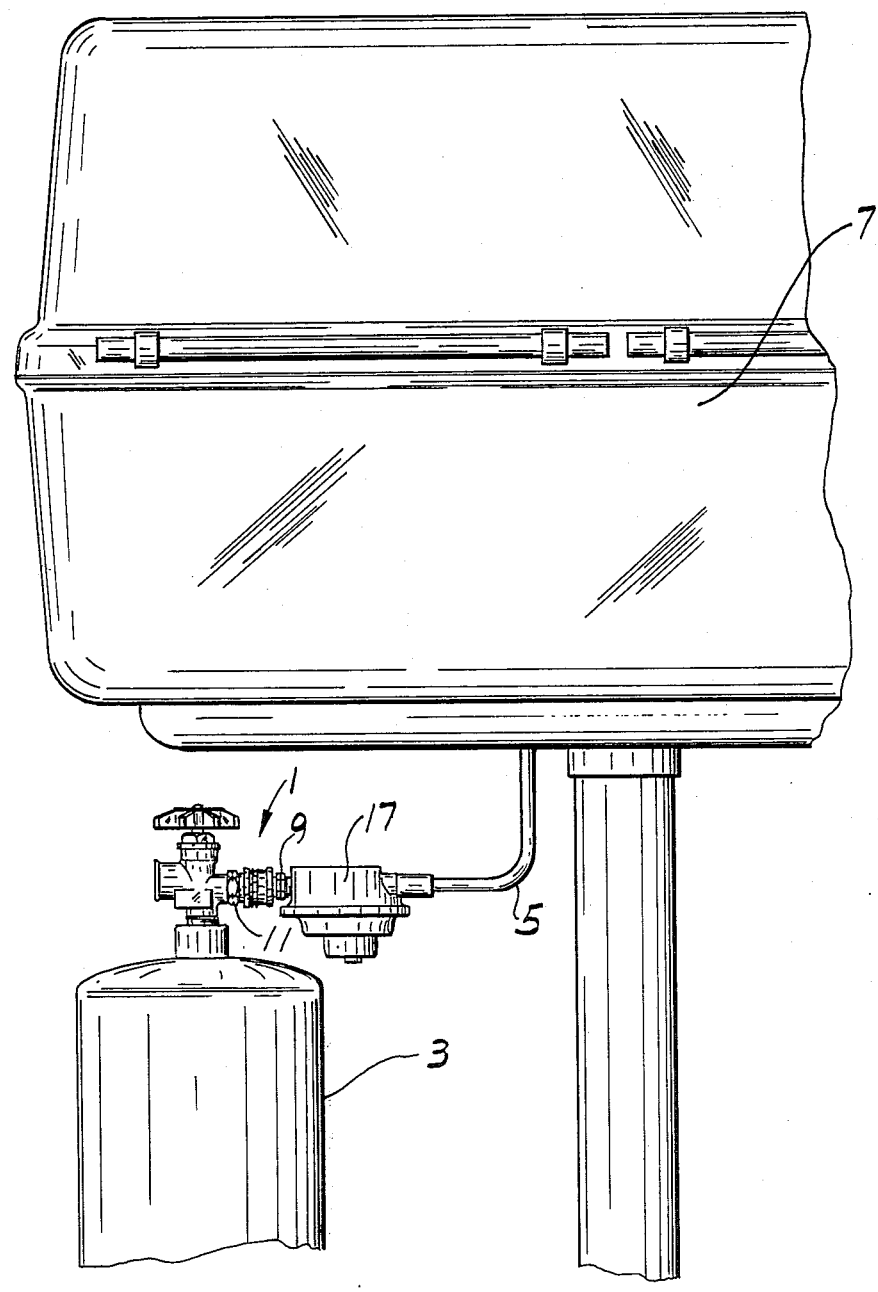
FIG. 1 is a view showing a quick-disconnect coupling of the present invention connecting a tank of pressurized gas to the gas line of a gas barbecue grill.

Referring now to the drawings, and more particularly to FIG. 1, a quick-disconnect coupling of the present invention is designated in its entirety by the reference numeral 1 and is shown connecting a fuel source constituted by a cylinder 3 containing pressurized natural or LP gas with a fuel line 5 to an appliance 7, in this case an outdoor barbecue or patio grill. As will appear in more detail hereinafter, this coupling incorporates an unique heat-sensitive safety cutoff feature whereby if the temperature of the coupling becomes dangerously high, indicating the presence of fire, for example, the coupling is operable to shut off the flow of gas to the appliance, thereby avoiding or at least reducing the risk of an explosion.

As best illustrated in FIG. 2, coupling 1 comprises interengageable plug and socket components indicated at 9 and 11 respectively, the socket component being threaded onto a nipple 15 on the gas cylinder 3, and the plug component being threaded into a conventional pressure regulator 17 in line 5. More specifically, the plug component 9 of coupling 1 comprises an elongate plug body 19 having a passage therethrough constituted by an axial bore 21 extending from one end of the body to the other. The left (upstream) end of the plug body is conical in shape and its right (downstream) end is formed with exterior threads for enabling the plug component to be screwed into regulator 17.

Socket component 11 comprises a socket body 23 having a passage therethrough constituted by a bore 25 extending axially of the body from one to the other, the bore having inlet (left) and outlet (right) ends with the outlet end forming a chamber 27 for receiving the left end of the plug body 19. As shown, a circular washer 29 bears against an inner annular shoulder 31 in bore 25 immediately to the left of chamber 27 and provides a valve seat 33. A poppet valve, designated generally 35, is mounted for axial movement in bore 25 to the left of valve seat 33.

In accordance with this invention, poppet valve 35 is a two-piece valve, comprising a stem 37 of suitable metal (e.g., brass) and sealing means 39 bonded to the stem in manner which will be described in more detail hereinafter. The valve stem 37 is generally circular in section except for its right (upstream) end which is in the form of a relatively thin blade 41 of reduced width at its outer end. For reasons which will appear below, the upstream (left) end of the valve stem is formed with an annular lip 43 thereon.

Sealing means 39 comprises a cylindrical sleeve 45, also of a suitable metal such as brass, and a sealing member in the form of an annular flange 47 formed integrally with the sleeve at the downstream (right) end thereof. A coil compression spring 49 reacting against a shoulder 51 in nipple 15 surrounds the valve stem 37 and sleeve 45 thereon and is engageable with the left annular face of flange 47 for biasing the poppet valve 39 toward a closed position in which the right annular face of flange 47 seals against valve seat 33 for blocking the flow of gas from cylinder 3. As shown in FIGS. 2-4, flange 47 is spaced upstream from the blade end 41 of the valve stem 37 so that when the poppet valve is in its closed position the blade end of the stem extends past the valve seat into socket chamber 27. As indicated at 49, the inlet end of socket bore 25 is internally threaded for receiving nipple 15, the end of which bears against the left annular face of washer 29 to secure the latter in position against shoulder 31.

When inserted into socket chamber 27, the left conical end of plug body 19 engages the blade (right) end 35 of the valve stem, with the reduced-width portion of the blade received in bore 21, for moving poppet valve 39 against the bias of spring 49 to an open position in which flange 47 is spaced upstream away from the valve seat 33 for permitting gas to flow therepast. For detachably connecting the plug and socket components 9, 11 in this position, that is, with the plug component received in socket chamber 27 and holding the poppet valve open, a series (e.g., 3) of detent balls, each designated 51, are mounted in holes 53 spaced at equal intervals around the circular socket wall adjacent the outlet end of the socket body 23. These balls are free to move radially with respect to the socket body between an inner locking position in which they are received in an annular groove 55 in the plug body 19 to couple the plug and socket components together, and a retracted position in which they are removed from groove 55, enabling the plug body to be moved in and out of the socket chamber 27. A locking collar, indicated at 57, around the outlet end of the socket body is moved axially with respect to that body between a locking position (FIG. 2) in which it holds the detent balls in their locking position for securing the plug and socket components together, and an unlocked position (not shown) in which the detent balls are free to move radially outwardly out of groove 55 in the plug body thereby to permit the components to be uncoupled. The locking collar 57 is urged toward its locking position by means of a spring 59 interposed between an outer annular shoulder 61 on the socket body and an inner annular shoulder 63 on the locking collar. The right (downstream) end of the locking collar is engageable with a retaining ring 65 around the socket body for limiting movement of the collar to the right with respect to the socket body.

As mentioned above, coupling 1 is heat-sensitive for shutting off the flow of gas to grill 7 in the event the temperature of the coupling exceeds a dangerously high level. This is accomplished by securing sealing means 39 (i.e., sleeve 45 and flange 47) to the valve stem 37 by means of a solder bond, designated 67 in FIGS. 3 and 4, set to melt at a relatively low temperature (e.g., 220° F.) well below the temperature at which the gas in cylinder 3 would ignite. The solder used for this bond is preferably a eutectic solder (such as that sold under the trade designation "212° fuseable metal—Alloy No. 3940-1" by Metal Specialties Co. of Fairfield, Connecticut and Cerro Copper Products of East St. Louis, Illinois) adapted to melt within a relatively narrow temperature range of 10° F. or less (e.g., 220° F.–230° F.).

It will be observed, therefore, that if the melting point of the solder bond 67 is exceeded when the plug and socket components 9, 11 are coupled as shown in FIG. 2, the bond will fail and spring 49 will push sleeve 45 in downstream direction (to the right) with respect to the valve stem 37 until flange 47 seals against valve seat 33 for shutting off the flow of gas to the gas grill (see FIG. 3). The fit between sleeve 45 and valve stem 37 is a relatively close fit to prevent the escape of gas therebetween past the valve seat after cutoff has been effected. If the plug and socket component are subsequently disconnected (by sliding locking collar 57 to the left), the valve stem may move to the right relative to sleeve 45 due to the relatively high pressure on the left end of the stem. Any such movement is limited by the engagement of lip 43 at the left end of the stem with the left end of sleeve 45, lip 43 thus constituting a stop.

It will be apparent from the foregoing that the design of the present coupling, wherein the safety cutoff mechanism is incorporated entirely within the socket component, is advantageous for a number of reasons, one being that the force required to actuate the cutoff mechanism is minimized since actuation does not involve moving the plug component 9 or the downstream gas line to which it is attached, as is the case in the prior art coupling described hereinabove. This in turn reduces the risk that the cutoff mechanism will become hung up or otherwise fail to operate. The fact that such mechanism is contained entirely within the socket component is also advantageous in that operation of the automatic cutoff mechanism is entirely independent of the type of plug component used.

As mentioned above, the bond 67 between sealing means 39 and valve stem 37 is preferably a eutectic solder bond adapted to melt with a relatively narrow temperature range (e.g., 10° F. or less). This is desirable so that the bond melts swiftly when its melting point is reached, thereby ensuring immediate actuation of the cutoff mechanism to cut off the flow of gas from the tank.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A quick-disconnect coupling with a heat-sensitive cutoff feature for use in connecting a fuel source, such as a tank of pressurized gas, with a gas appliance, such as an outdoor gas grill, comprising interengageable plug and socket components, the latter component having a passage therethrough with inlet and outlet ends, the outlet end forming a chamber for receiving said plug component, a valve seat in the passage, a valve member in the passage comprising a valve stem and sealing means on the valve stem engageable with said valve seat, said valve member being movable in the passage between a closed position in which said sealing means is in sealing engagement with said valve seat to block flow therepast, and an open position in which said sealing means is spaced away from the valve seat to permit flow through the passage, spring means engageable with said sealing means for biasing said valve member toward its closed position, said plug component being adapted, on insertion into said socket chamber, to engage said valve stem for moving the valve member against the bias of said spring means from its closed to its open position for flow of gas past the valve seat, and means for detachably connecting the plug and socket components with the plug component received in said socket chamber and holding the valve member in its open position, said sealing means being secured in fixed position with respect to said valve stem by means having a relatively low melting point whereby when said plug and socket components are connected and said melting point is exceeded, said spring means is adapted to move said sealing means with respect to said valve stem into sealing engagement with said valve seat to cut off flow of gas therepast.

2. A quick-disconnect coupling as set forth in claim 1 wherein said sealing means and said valve stem are secured together by a solder bond.

3. A quick-disconnect coupling as set forth in claim 2 wherein said bond is a eutectic solder bond adapted to melt within a relatively narrow temperature range of 10° F. or less.

4. A quick-disconnect coupling as set forth in claim 1 wherein said sealing means is secured to said valve stem upstream of one end, constituting the downstream end, of the valve stem.

5. A quick-disconnect coupling as set forth in claim 4 wherein said sealing means comprises a sleeve bonded to said valve stem and a sealing member on the sleeve engageable by said spring means, said sealing member being slidable on the stem into engagement with the valve seat for blocking flow therepast when said melting point is exceeded.

6. A quick-disconnect coupling as set forth in claim 1 further comprising means for limiting downstream movement of said valve stem with respect to said sealing means when said securing means has melted and said plug component is disconnected from said socket component.

7. A quick-disconnect coupling as set forth in claim 6 wherein said limiting means comprises a stop on said valve stem upstream of said sealing means.

8. A socket component of a quick-disconnect coupling adapted for use in connecting a fuel source, such as a tank of pressurized gas, with a gas appliance, such as an outdoor gas grill, said socket component having a passage therethrough with inlet and outlet ends, the outlet end forming a chamber for receiving a plug component, a valve seat in the passage, a valve member in the passage comprising a valve stem and sealing means on the valve stem engageable with the valve seat, said valve member being movable in the passage between a closed position in which said sealing means is in sealing engagement with the valve seat to block flow therepast and an open position in which said sealing means is spaced away from the valve seat to permit flow through the passage, spring means engageable with said sealing means for biasing said valve member toward its closed position, said valve stem being engageable by said plug component on insertion of the latter into said socket chamber for movement of the valve member against the bias of said spring means from its closed to its open position, and means for releasably securing said plug component in said socket chamber with the plug component holding said valve member open, said sealing means being secured in fixed position with respect to said valve stem by means having a relatively low melting point whereby when said plug component is secured in said socket chamber, with said valve member held open, and said melting point is exceeded, said spring means is adapted to move said sealing means with respect to said valve stem into sealing engagement with said valve seat to cut off flow of fuel from said fuel source.

9. A socket component as set forth in claim 8 wherein said sealing means and said valve stem are secured together by a solder bond.

10. A socket component as set forth in claim 9 wherein said bond is a eutectic solder bond adapted to melt within a relatively narrow temperature range of 10° F. or less.

11. A socket component as set forth in claim 8 wherein said sealing means is secured to said valve stem upstream of one end, constituting the downstream end, of the valve stem.

12. A socket component as set forth in claim 11 wherein said sealing means comprises a sleeve bonded to said valve stem and a sealing member on the sleeve engageable by said spring means, said sealing member being slidable on the sleeve into engagement with the valve seat for blocking flow therepast when said melting point is exceeded.

13. A socket component as set forth in claim 8 further comprising means for limiting downstream movement of said valve stem with respect to said sealing means when said securing means has melted and said plug component is disconnected from said socket component.

14. A socket component as set forth in claim 13 wherein said limiting means comprises a stop on said valve stem disposed upstream of said sealing means.

* * * * *